United States Patent [19]
Boltze et al.

[11] Patent Number: 5,204,035

[45] Date of Patent: Apr. 20, 1993

[54] METHOD FOR PRODUCING INDIVIDUAL POLYMER PROFILES BY EXTRUDING INTERCONNECTED POLYMER PROFILES AND SEPARATING THEM

[75] Inventors: Carsten Boltze, 3765 Ramsey Dr., Uniontown, Ohio 44685; Klaus Kleinhoff, Suntalstr. 42, 3054 Rodenberg; Hendrik Stevens, Hanover, both of Fed. Rep. of Germany

[73] Assignees: Klaus Kleinhoff, Rodenberg, Fed. Rep. of Germany; Carsten Boltze, Uniontown, Ohio

[21] Appl. No.: 822,541

[22] Filed: Jan. 17, 1992

[30] Foreign Application Priority Data

Jan. 17, 1991 [DE] Fed. Rep. of Germany ....... 4101187

[51] Int. Cl.$^5$ .............................................. B29C 69/00
[52] U.S. Cl. ................................... 264/146; 264/157; 264/177.1; 264/236
[58] Field of Search ................... 264/177.1, 146, 159, 264/157, 177.17, 236, 297.5, 347; 425/308, 307, 310

[56]  References Cited

U.S. PATENT DOCUMENTS

| 12,685 | 7/1907 | Reynolds | 264/146 |
|---|---|---|---|
| 2,050,214 | 8/1936 | Stephens | 264/146 |
| 4,092,092 | 5/1978 | Dye et al. | 425/308 |
| 4,563,319 | 1/1986 | Ausnit et al. | 264/146 |
| 4,635,294 | 1/1987 | Bentsen | 264/146 |
| 4,851,067 | 7/1989 | Ogawa et al. | 264/146 |
| 4,904,434 | 2/1990 | Hyer | 264/148 |
| 4,981,637 | 1/1991 | Hyer | 264/146 |

Primary Examiner—Jill L. Heitbrink
Attorney, Agent, or Firm—Robert W. Becker & Associates

[57] ABSTRACT

A method for producing polymer profiles, having a varying thickness over their width and at least one longitudinal side tapering off to form a thin edge, includes of the following steps: Extruding simultaneously a plurality of the polymer profiles through a common die such that the thin edge of each one of the polymer profiles is connected to the thin edge of at least the neighboring one of the polymer profiles to form an interconnected extrudate; in a cross-section of the interconnected extrudate, providing an angle of between 45° and 135° between angle bisectors of neighboring ones of the polymer profiles; and separating the polymer profiles from one another after the step of extrusion.

15 Claims, 4 Drawing Sheets

METHOD FOR PRODUCING INDIVIDUAL POLYMER PROFILES BY EXTRUDING INTERCONNECTED POLYMER PROFILES AND SEPARATING THEM

BACKGROUND OF THE INVENTION

The present invention relates to a method for producing polymer profiles having a varying thickness over a width of the polymer profiles and with at least one longitudinal side tapering off to form a thin edge.

When extruding profiles the following problem is encountered: When a uniform extrusion pressure is present, the flow resistance in the thinner profile sections is greater and the flow velocity i s smaller than in the sections of the thicker profile due to the greater closeness of the die walls. As long as the differences in thickness are not to great this effect may be compensated for because the thicker profile sections will pull along the thinner profile sections due to the viscosity of the extrudate while the thicker sections simultaneously experience a certain delay and compression. However, the thinner profile sections are pulled along and accelerated and stretched to such an extent that in a stationary state at a certain distance behind the die the extrudate velocity is equal over the entire width of the profile.

In this context, the term "thin edges" refers to such profile edges in which the tangents in the cross-sectional plane extending through the edge point enclose an angle of less than 50°. Accordingly, the smaller the enclosed angle between the tangents, the thinner is the corresponding edge.

When making these edges thinner and thinner the following problem results: The thinnest profile sections that is the profile sections in immediate proximity to the edge, may not be pulled along to a sufficient extent by the thicker profile sections (based on the viscosity of the extrudate) so that they are partially retained and form irregular seams. When this effect is observed, the corresponding edges must be made thicker or the small chamfer (edge trimming) must be increased However, for constructive reasons, the chamfer for thin edges should also be very small. Accordingly in the extrusion of most profiles, for example, side walls of vehicle tires made of rubber mixtures, the process is always carried out at the borderline of forming irregular seams.

When operating within these slim limits, a further problem is that the thin edges, which are stressed to a point close to their rupture limit, and the compressed thicker profile sections try to compensate the different stress levels by exiting from the die (the extrusion die is viewed from the side) in a bent shape whereby the thin edges follow a smaller radius and the thicker profile sections follow a greater radius. The resulting bent section extends in the plane which is perpendicular to the main extension of the profile cross-section. If the profile to be extruded has a curved cross-section, this curvature will be increased by the extrusion step; this effect is usually not detrimental to the product. However, the aforementioned undesired bending may only be reproduced within certain limits and is thus detrimental to the manufacturing process. For example, the bending of the profile impairs the extrusion of cover layers for vehicle tire side walls having two thin edges and of tread portions for tires. The curving effect also prevents the extrusion of wiper blades which are provided with a thin edge. Instead, such wiper blades must be manufactured by a molding process.

In the recent U.S. Pat. No. 4,981,637, a method has been disclosed for forming a wiper blade in a continuous extrusion process. The die opening is shaped to produce a pair of wiper blades joined edge-to-edge. The pair of wiper blades extends in the same plane. The undesired curving effect, however, may not be prevented with this extrusion method.

It is therefore an object of the present invention to prevent or suppress the bending effect for extrudates having thin edges.

SUMMARY OF THE INVENTION

The method for producing polymer profiles of the present invention is primarily characterized by the following steps: Extruding simultaneously a plurality of the polymer profiles through a common die such that the thin edge of each one of the polymer profiles is connected to the thin edge of at least a neighboring one of the polymer profiles to form an interconnected extrudate; in a cross-section of the interconnected extrudate, providing an angle of between 45° and 135° between angle bisectors of neighboring ones of the polymer profiles; and separating the polymer profiles from one another after the step of extrusion.

According to the present invention, the plurality of polymer profiles are simultaneously extruded such that in a cross-sectional view they are positioned in an angular arrangement relative to one another and extruded by a common die such that they are interconnected. The thin edges of each individual polymer profile is connected to a respective thin edge of a neighboring polymer profile and the angle, in the cross-sectional plane, between the angle bisectors of the interconnected neighboring thin edges is between 45° and 135°. The simultaneously and connectedly extruded polymer profiles are separated after the extrusion step. Preferably, the connections of the thin edges of neighboring polymer profiles have a thickness of at least 0.5 mm.

The method of the present invention functions according to the following principle: The various profile strips which tend to undergo a bending deformation based on their considerable tension resulting from the unequal, thickness-depending exiting velocity of the die are connected to one another such that they prevent the aforementioned undesired deformation, respectively, bending, of each individual profile strip. This solution initially does not try to eliminate the causes of the undesired effect, but is designed to suppress the undesired effect. In a preferred embodiment of the present invention the causes are subsequently eliminated by storing the extrudate between the extrusion step and the separation step until a compensation of the stess load has been achieved. The compensation of the stress load is based on small sliding movements of the molecules within the extrudate.

In order to provide this preventive measure against deformation during the time period necessary for the stress load compensation and/or until the final shape is fixed by hardening or solidifying of plastics, respectively, by vulcanization of rubber mixtures to rubber, the dimension of the connection between the thin edges of neighboring profiles must be determined relative to the size of the profile and the degree of the variation between the thickness of the thicker and the thinner sections In profiles which are used as semi-products in the tire manufacturing industry, first experiments have demonstrated that a thickness of 0.5 to 0.8 mm, depending on the tire dimensions, is useful. For thinner profiles, obviously a thinner connection of neighboring profiles is expedient.

A deciding factor for further embodiments of the present invention is the member of thin edges provided at the extruded profiles. Profiles for the further use within the tire manufacturing industry are usually provided with two thin edges, for example, in the case of sidewalls a radially outwardly and a radially inwardly oriented thin edge, in the case of tread portions an axially left and an axially right oriented thin edge, whereby the designation of the given positions corresponds to the resulting finished tire. Technical profiles, for example, some sealing profiles, are often provided with only one thin edge. Among the technical products with one thin edge, wiper blades for vehicles are an important manufacturing field with respect to sales FIGURES. With the present invention it has been possible for the first time to provide a faster and more economical extrusion process for these profiles.

For the production of profiles which have only one thin edge it is expedient to extrude the profiles in a star-like arrangement relative to one another whereby all of the individual polymer profiles to be produced have their respective thin edge extending towards the center of the star-like interconnected extrudate. With this arrangement the die core is obsolete so that, due to the compact form of the die with respect to the cross-section of the extrudate, the total flow resistance of the die reaches a minimum, and the location of the highest flow resistance is at the center of the die where the extrusion pressure is highest.

In a manner known per se, the extrusion of thin edges may be improved by providing a material recycling step which includes the provision of a blind channel. For a star-shaped die embodiment such a blind channel, if at all necessary, should expediently be arranged in the center where it would be effective for all of the thin edges. The recycled material per each extrudate volume would thus be minimized. However, in most cases when using the inventive method a blind channel is obsolete.

In order to obtain a stable cross-sectional shape, the minimum number of polymer profiles to be extruded in an interconnected manner with the star-shaped arrangement is three. This minimum number of three is believed to be the optimum for the required stability according to the experiments carried out to date. In order to increase the output for a faster and more economical manufacturing process without excessive loss of stability, the number of extruded polymer profiles having a thin edge may be increased to five per die.

As an alternative to the star-shaped extrusion for the manufacture of profiles with only one thin edge it is suggested that two individual polymer profiles, when viewed in cross-section, are arranged at approximately a right angle (90°) relative to one another resulting in a V-shaped arrangement of the interconnected extrudate, whereby the thin edges extend towards the angle point of the V-shaped arrangement. Due to the approximate right angle position of the interconnected polymer profiles, the interconnected profiles prevent the aforementioned undesired bending deformation. In this embodiment, a slight bending deformation is still observed but it is reproducible within a narrow margin due to the reduced amount of influencing factors. Especially for smaller manufacturing quantities the disadvantage of a smaller output per die is overcome by the advantage of the simplified manufacture of the die itself.

For producing polymer profiles having two thin edges a different process is preferable. In this process, the individual polymer profiles are extruded such that they are interconnected in an endless manner when viewed in cross-section so that a hose-like interconnected extrudate is formed. In this embodiment the die is provided with a core which is connected to the outer contour of the die by respective supports. Expediently, the number of supports corresponds to the number of interconnected extruded polymer profiles. The supports are preferably arranged in series with the respective widest flow cross-section before the outlet opening of the die, where the additional flow resistance is of no detrimental effect, but, to the contrary, advantageously contributes to a more uniform flow velocities.

In order to achieve favorable angles between the individual polymer profiles for the desired stiffening of the interconnected extrudate, it is expedient to extrude not more than eight individual profiles of an identical cross-section. The minimum number of interconnected individual polymer profiles to be extruded is three. The limitation of individual profiles within a common, interconnected extrudate to the minimum number has proved especially advantageous.

Besides the preferred extrusion of identical polymer profiles as an interconnected extrudate with which the greatest possible precision may be achieved, it is also possible to extrude different polymer profiles as an interconnected extrudate in order to provide a greatest possible flexibility within the manufacturing process. This method results in satisfactory products when the individual polymer profiles are arranged axis-symmetrically. Thus, it is possible to extrude in an interconnected manner two polymer profiles for the production of tire sidewalls and one profile which is designed to become a part of the tire tread. The respective configuration is an isosceles triangle. The axis of symmetry of this triangle should extend vertically, i.e., in the direction of gravity, in order to prevent systematic asymmetries.

With technically difficult polymer profiles it is often necessary to optimize the material distribution according to local loads. Such polymer profiles are composed of various materials. According to a preferred embodiment of the present invention the borders between the various materials should not be within the area of the thin edges or in the thin connection between the thin edges. That is to say that the interconnected thin edges of the polymer profiles should always be comprised of the same materials.

In another embodiment the method of the present invention further comprises the step of vulcanizing the interconnected extrudate before the step of separating the polymer profiles. For the production of semiproducts, it is expedient that the step of separating the polymer profiles is carried out in an unvulcanized state of the interconnected extrudate. For producing semiproducts, it is also possible that the step of separating the polymer profiles is carried out in a semi-vulcanized state of the interconnected extrudate.

Accordingly, when the polymer is a vulcanizable rubber mixture, the method of the present invention may be divided according to the desired purpose, i.e., the production of finished parts or the production of semiproducts.

When the production of semiproducts is desired, the polymer profiles must not be vulcanized before their further processing, that is, before the separation into the individual profiles. The separation thus must occur in the unvulcanized or in the semi- or pre-vulcanized state. Pre-vulcanization or semi-vulcanization in this context refers to a first vulcanization state in which at most 20% of the cross-linking density of the completely vulcanized material has been reached, preferably, only 1% to 15%. When determining the cross-linking density of the pre-vulcanized product it must also be considered that a higher cross-linking density (higher degree of cross-linking) results in a reduced bending deformation but also in a reduced loading capacity of the contact areas of the polymer profile to the component to which it will be connected subsequently. These diverging properties may be compensated by storing the interconnected extrudate between the extrusion step and the separation step until a stress load compensation has taken place. The stress load compensation occurs due to small and slow flowing movements of the molecules in the profile. The optimum, for compromising the properties is then shifted to a lesser degree of vulcanization during the pre-vulcanization step. Expediently, the sequence of method steps is the following: Interconnected extrusion, storage (aging), pre-vulcanization (approximately 5%), and separation.

When the polymer profiles are designed to be used as finished products or are subsequently subjected to mere assembly steps requiring no vulcanization (for example, gluing or clamping), then the aforementioned diverging properties are without effect. The interconnected extrudate then undergoes vulcanization as closely as possible behind the extrusion die and is subsequently separated. The vulcanization is preferably carried out as a continuous process. When the vulcanization is performed within a constriction of a die extension, in which case, for the reduction of wear, the bordering areas adjacent to the respective extension of the die must be lubricated by providing a fluid, the continuous vulcanization may also be carried out under pressure which results in especially smooth surfaces. The lubricants to be used may, for example, be salt water or inert gases, respectively, gas mixtures, such as carbon dioxide or similar gases.

The separation into the individual polymer profiles may be achieved in principle with all known cutting techniques. Preferably, the separation is carried out in a continuous process. When vulcanized extrudates are to be separated it is expedient to provide moving knives such as rotating blades to improve the cutting output. For the separation of unvulcanized or pre-vulcanized extrudates a heated knife arrangement may be preferable.

BRIEF DESCRIPTION OF THE DRAWINGS

This object, and other objects and advantages of the present invention, will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 3.

Figure 1A:
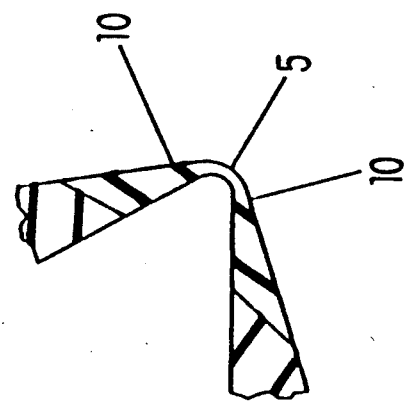
FIG. 1a shows a detail of FIG. 1.
Figure 1:
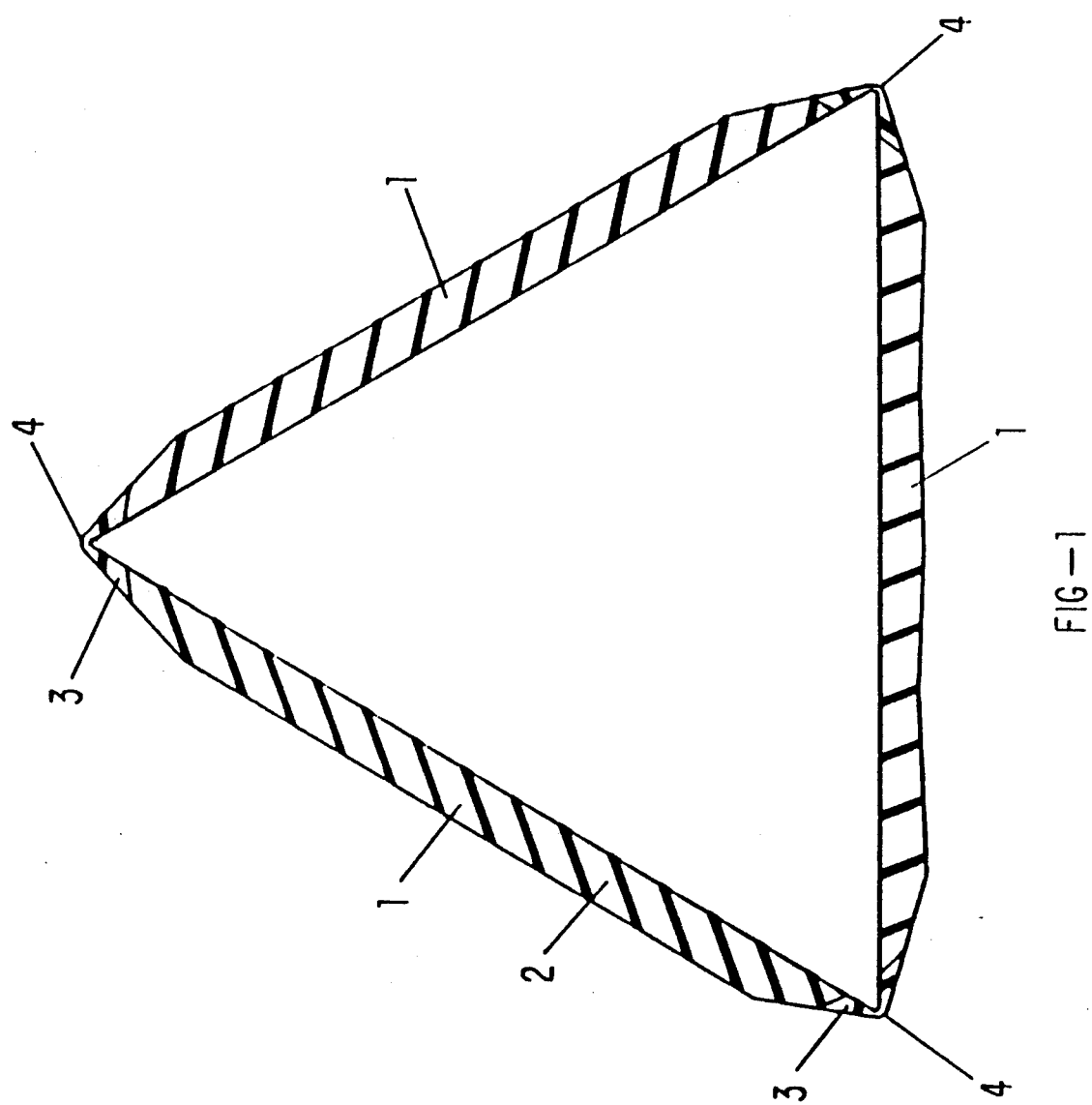
FIG. 1 shows the extrusion of three identical profiles that are interconnected.

FIG. 1 shows a cross-sectional view of the interconnected extrudate of three identical tread strips 1 for tires. Each tread strip profile 1 consists of a center portion 2 and two edge portions 3. The center portion 2 and the edge portions 3 differ in their rubber mixtures. The edge portions 3 which are also called skirts, are comprised of a rubber mixture of a reduced stiffness and a reduced hysteresis loss as compared to the center portion 2 in order to achieve a more uniform material transition of the tread portion to the side wall. In this manner, loosening problems between the radially outwardly oriented edges of the side wall strips and the contacting tread strips within the finished tire are reduced.

The three individual profiles 1, when viewed in cross-section, form a triangle with three equal sides and three corners 4. The individual profiles 1 are connected via thin curved cross-pieces 5 with one another at the corners 4. FIG. 1a shows such a cross-piece 5 in a detailed view. The cross-piece 5, in the shown example, has a thickness of 0.8 mm. This dimension provides the cross-pieces 5 with enough strength to prevent the tendency of each individual profile 1 to form a bending deformation. The strength of the cross-pieces 5 must, of course, increase with the bending tendency of the profiles.

Figure 2:
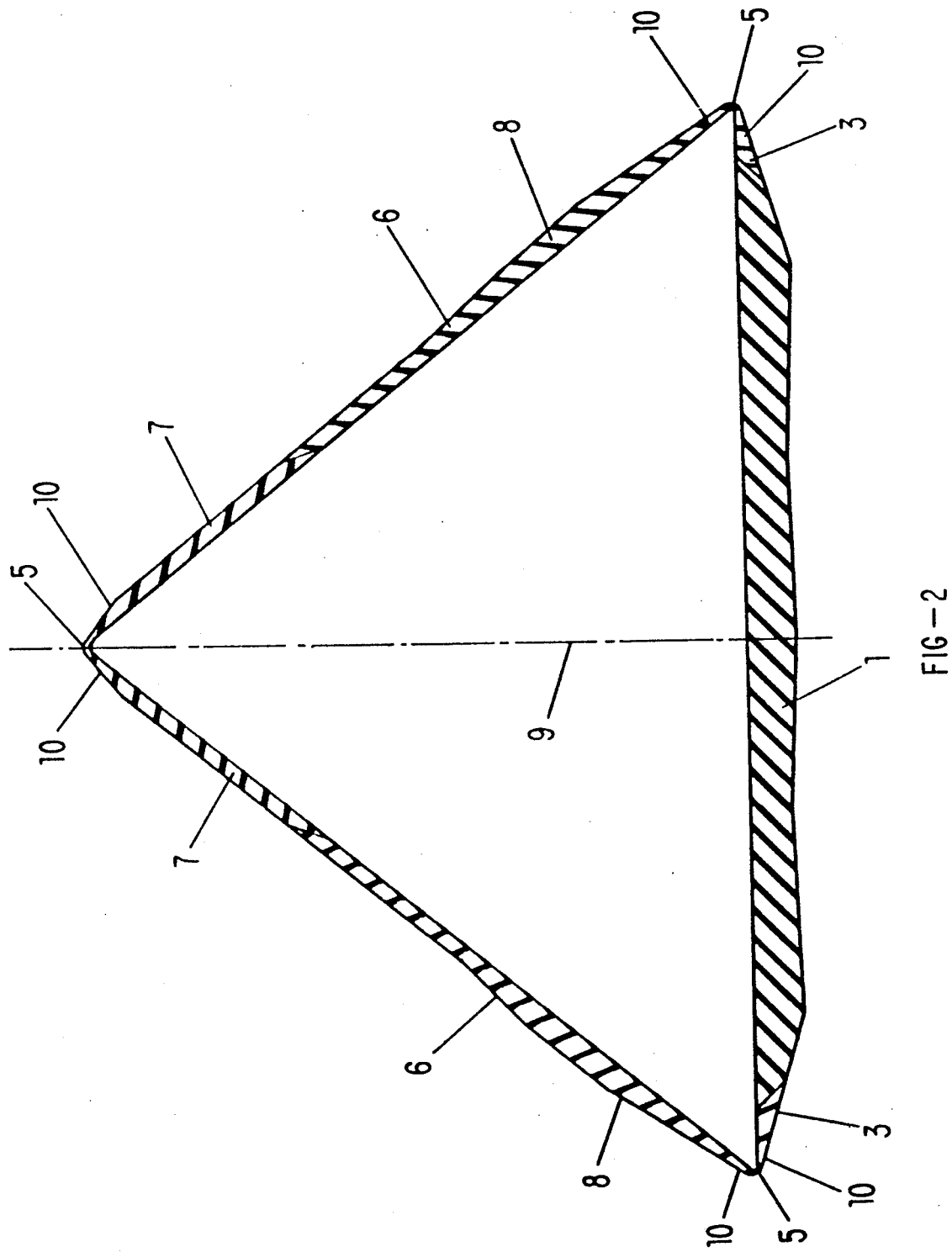
FIG. 2 shows the extrusion of two identical side walls interconnected with a tread portion of a tire.

FIG. 2 shows a cross-sectional view of the interconnected extrudate of two identical side wall strips 6 and a tread strip 1. The tread strip 1 of this FIGURE is of an identical construction as the tread strip of the FIG. 1 so that the same reference numerals are used. The side wall strips 6 are comprised of a portion 7 to be placed adjacent to the bead of the tire and a portion 8 forming the flanks of the tire. The portion 7 is comprised of a hard rubber mixture in order to resist the pressure exerted by the mounting on the rim flange, while the portion 8 which in the finished tire extends to the shoulder is comprised of a more flexible rubber mixture for facilitating the shock absorbing function of the tire. The skirts 3 of the tire tread strip 1 are comprised of the same rubber mixture as the portion 8 of the side wall strips 6.

A logistical simplification of the production schedule is achieved by using the interconnected extruded side wall strips and tread strips within the same tire series. The possibility of incorrectly arranging components of the tire is thus prevented during the master forming of the tire components. Expediently, the interconnectably extruded side wall strips and tread strips are separated before being placed onto the carcass respectively the belt layers.

The cross-section of the extrudate of this embodiment shows in principle a triangle with two equal sides having a symmetry axis 9 which is shown as a dash-dotted line. The two side wall strips 6 form the identical sides of the triangle while the tread strip 1 forms the triangle basis.

The method of the present invention is not restricted to the application for one-layered tread strips 1, as shown in the FIGS. 1 and 2. To the contrary, the present invention allows the interconnected and simultaneous extrusion of multi-layer tread strips, if desired, together with other parts such as side walls. FIGS. 1 and 2 are only intended to demonstrate simultaneously extruded profiles having two thin edges 10 which are connected via short, thin cross-pieces 5 and form an endless ring-shaped cross-section. According to the use of these extrudates as semiproducts in the tire manufacture, the interconnected extrudates are pre-vulcanized before the separation into the individual profiles takes place.

Figure 3:
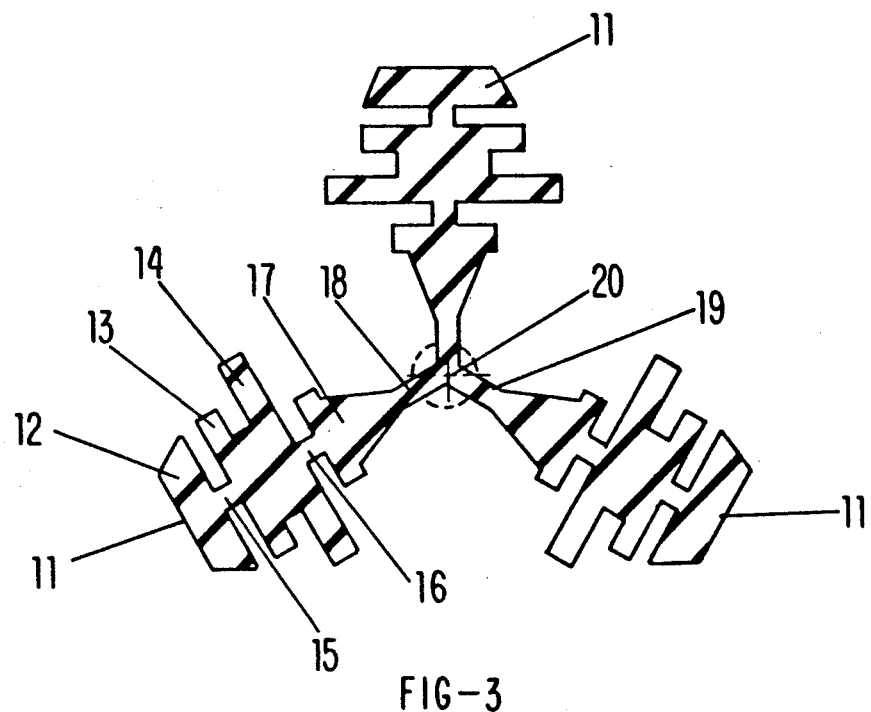
FIG. 3 shows the extrusion of three identical wiper blades that are interconnected.

FIG. 3 shows a cross-sectional view of the interconnected extrudate of three identical interconnected wiper blades 11. These wiper blades 11 are segmented into three ribs 12, 13, 14, provided within the main portion 15, a joint portion 16 and a wiping portion 17 which tapers off into a lip 18 which, in the context of this application, represents the thin edge. The thin edges 18 of all three profiles 11 extend towards the center 20 of the star-shaped arrangement. Special quality requirements are placed on wiper blade profiles in the area of the gliding surfaces 19 which, on the one hand, must be very smooth, in order to prevent smearing and on the other hand must be wear-resistant.

Figure 3A:
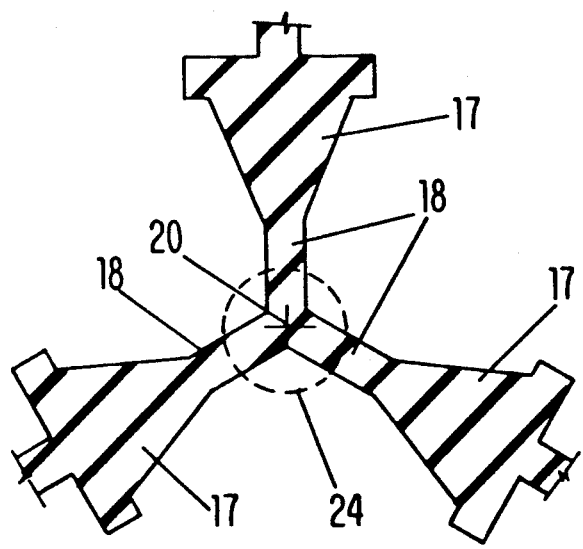
FIG. 3a shows a detail of FIG. 3.

FIG. 3a represents the radially inwardly oriented part of the interconnected extrudate in a detailed view. The wiping portion 17 with its thin edges 18 is shown. The thick dashed line represents the cutting edge 24 of a circular knife with which the interconnected extrudate is separated into individual profiles when forced against the cutting edge 24. In order to improve the cutting efficiency, however, while at the same time accepting a certain asymmetry of the finished product, it may be expedient to rotate the circular knife about the central axis 20.

Figure 3B:
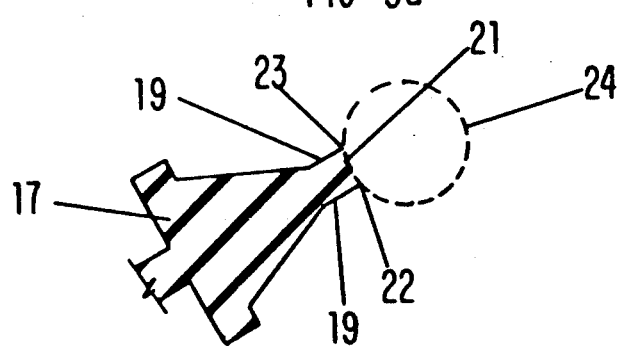
FIG. 3b shows a detail of a finished wiper blade after the separation step.
Figure 4:
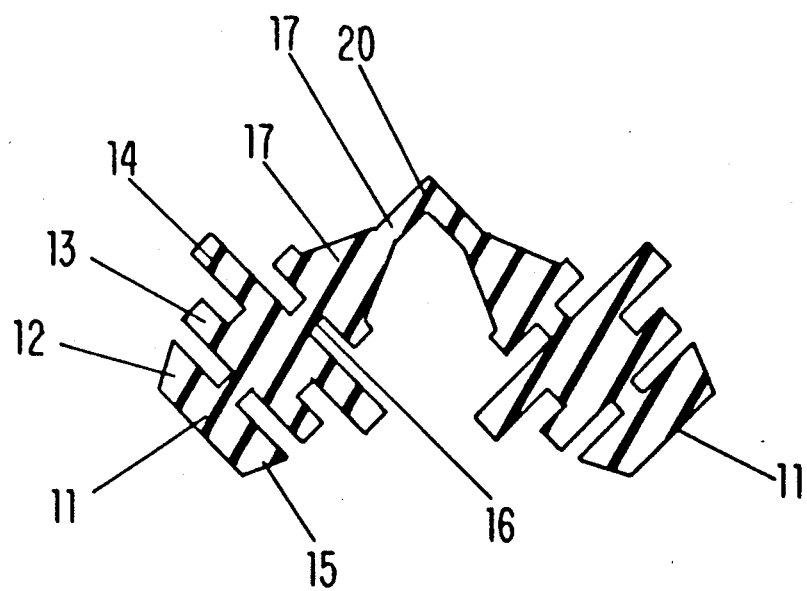
FIG. 4 shows the extrusion of two identical wiper blades interconnected in a V-shaped manner.

FIG. 3b shows the wiping portion 17 of an inventively extruded wiper blade after the separation, the representation being of the same scale as the representation FIG. 3a. The roundness of the knife with the cutting edge 24 results in the formation of a hollow head surface 21 of the thin edges 18. This means that when during the movement of the wiper blade a change of direction takes place the head surface 21 will not rest on the windshield, but only the edges 22 and 23 will be in contact. Each of the edges 22 and 23, on the one hand, is formed by a cut surface, i.e., the head surface 21, and, on the other hand, by an uncut surface, i.e., the gliding surface 19. It is known that for comparable materials a cut surface exhibits a higher wear than the master-formed surface (in this case: extruded surface), but in the shown embodiment no disadvantageous wear is observed because the cutsurface, i.e., the hollow head surface 21, does not come into contact with the windshield. Only the uncut extruded gliding surfaces 19 are exposed to wear.

The suggested method for producing wiper blades is especially easy to realize when cross-sectional variations over the length of the wiper blade are omitted. It is understood that in this case, in order to prevent longitudinal movement of the wiper blade relative to the wiper arm, respective fastening elements must be provided at the wiper arm. For this purpose small bendable projections may be arranged at the wiper blade arm which are clamped against the face of the wiper blade.

In another preferred embodiment of the inventive method the vulcanization of the wiper blades takes place within the end section of the die, while the extrusion is carried out in a vertically downward direction. Preferably, the individual wiper blades are guided into the horizontal direction only after the vulcanization is complete and the separation into individual profiles has taken place. Due to the vertical extrusion direction the systematic asymmetry error of the interconnected extrudate resulting from gravity may be entirely eliminated.

The present invention teaches the suppression of undesired deformations of profiles having one or more thin edges, respectively, lips by simultaneously extruding a plurality of such profiles whereby these profiles are interconnected at their thin edges, respectively, lips by thin cross-pieces so that a movement relative to one another is prevented. While the tool costs for the inventive method are higher, the production is expedited and the quality of the end product is improved.

The present invention is, of course, in no way restricted to the specific disclosure of the specification and drawings, but also encompasses any modifications within the scope of the appended claims.

What we claim is:

1. A method for producing polymer profiles, having a varying thickness over a width of said polymer profiles and with only one longitudinal side tapering off to form a thin edge, said method comprising the steps of:
    extruding simultaneously a plurality of said polymer profiles through a common die such that said thin edge of each one of said polymer profiles is connected to said thin edge of at least a neighboring one of said polymer profiles to form an interconnected extrudate;
    providing in a cross-section of said interconnected extrudate an angle between angle bisectors of said interconnected neighboring thin edge of between 45° and 135°; and
    separating said polymer profiles from one another after said step of extrusion.

2. A method according to claim 1, wherein an area in which said thin edges are connected to one another has a thickness of at least 0.5 mm.

3. A method according to claim 1, wherein three of said polymer profiles are extruded together to form said interconnected extrudate.

4. A method according to claim 1, wherein said polymer profiles, each having one of said thin edges, are extruded such that a cross-section of said interconnected extrudate is a star-shaped arrangement with a center, with said thin edges extending towards said center of said star-shaped arrangement.

5. A method according to claim 1, wherein two of said polymer profiles, each having one of said thin edges, are extruded at an angle of approximately 20° relative to one another providing a V-shaped arrangement to said interconnected extrudate, with said thin edges extending towards an angle point of said V-shaped arrangement.

6. A method according to claim 1, wherein identical ones of said polymer profiles are extruded to form said interconnected extrudate.

7. A method according to claim 1, wherein different ones of said polymer profiles are extruded in an axis-symmetrical arrangement.

8. A method according to claim 1, further comprising the step of providing different polymer mixtures over said width of at least two of said polymer profiles, with respective ones of said polymer mixtures provided at said thin edges of said neighboring ones of said polymer profiles being identical to one another.

9. A method according to claim 1, further comprising the step of vulcanizing said interconnected extrudate before said step of separating said polymer profiles.

10. A method according to claim 1, wherein, for producing semiproducts, said step of separating said polymer profiles is carried out in an unvulcanized state of said interconnected extrudate.

11. A method according to claim 1, wherein, for producing semiproducts, said step of separating said polymer profiles is carried out in a semi-vulcanized state of said interconnected extrudate 12. A method according to claim 1, further comprising the step of storing said interconnected extrudate before said step of separating said polymer profiles for achieving a stress load compensation within said interconnected extrudate.

13. A method according to claim 1, wherein said polymer profiles are wiper blades.

14. A method for producing polymer profiles, having a varying thickness over a width of said polymer profiles and with only one longitudinal side tapering off to form a thin edge, said method comprising the steps of:

extruding simultaneously a plurality of said polymer profiles through a common die such that said thin edge of each one of said polymer profiles is connected to said thin edge of at least a neighboring one of said polymer profiles to form an interconnected extrudate;

providing in a cross-section of said interconnected extrudate an arrangement of said individual polymer profiles in which each angle between angle bisectors of said interconnected neighboring thin edges is between 45° and 135°, said arrangement having one common connection line, with said thin edges extending towards said common connection line of said arrangement; and separating said polymer profiles from one another after said step of extrusion.

15. A method according to claim 14, wherein at least three of said polymer profiles are extruded simultaneously through a common die, such that all of said angles between said angle bisectors of said interconnected neighboring thin edges are substantially identical, resulting in a star-shaped cross-section of said interconnected extrudate with said one connection line being centrally positioned.

* * * * *